Oct. 28, 1924.

K. O. MUEHLBERG 1,512,998

APPARATUS FOR REAMING ENGINE BEARINGS

Filed May 6, 1921 — 2 Sheets-Sheet 1

Inventor
Karl O. Muehlberg.
By Morrill & Keeney,
Attorneys.

Oct. 28, 1924.

K. O. MUEHLBERG 1,512,998

APPARATUS FOR REAMING ENGINE BEARINGS

Filed May 6, 1921     2 Sheets-Sheet 2

Inventor
Karl O. Muehlberg.
By Morsell + Keeney,
Attorneys

Patented Oct. 28, 1924.

1,512,998

UNITED STATES PATENT OFFICE.

KARL O. MUEHLBERG, OF MANITOWOC, WISCONSIN.

APPARATUS FOR REAMING ENGINE BEARINGS.

Application filed May 6, 1921. Serial No. 467,428.

*To all whom it may concern:*

Be it known that I, KARL O. MUEHLBERG, a citizen of the United States, and resident of Manitowoc, in the county of Manitowoc and State of Wisconsin, have invented new and useful Improvements in Apparatus for Reaming Engine Bearings, of which the following is a description, reference being had to the accompanying drawings, which are a part of this specification.

This invention relates to apparatus for reaming engine bearings, particularly two-part annular engine bearings.

The primary object of the invention is to provide apparatus for the purpose above specified which will be of simple construction, convenient to operate and which will accurately maintain the reaming tool, during the reaming operation, in axial alignment in the bearing being reamed.

The invention contemplates a pair of holding members which are adapted to be slipped over the ends of the two-part bearing to be reamed and means for clamping the holding members thereon, and a further object of the invention is to provide means, preferably in the form of a plurality of set screws positioned in said holding members and which are adapted to bear against the outer surfaces of the bearing to prevent the parts thereof spreading apart during the reaming operation.

A further object of the invention is to provide means whereby the shaft carrying the reaming tool may be quickly and conveniently initially placed in one or both of the holding members so that the reaming tool carried thereon will be ready to perform the reaming operation when the shaft is rotated without having to take up any loss of motion.

A further object of the invention is to provide a novel form of cutter head on the shaft whereby the reaming tool may be mounted in the cutter head so as to take a cut of the desired depth and then effectively secured in the cutter head against slippage.

The invention consists in the novel constructions, arrangements and devices to be hereinafter described and claimed for carrying out the above stated objects and such other objects as will appear from the following description of a certain preferred embodiment illustrated in the accompanying drawings, wherein—

Like characters of reference designate like parts in the several views.

Figure 3:
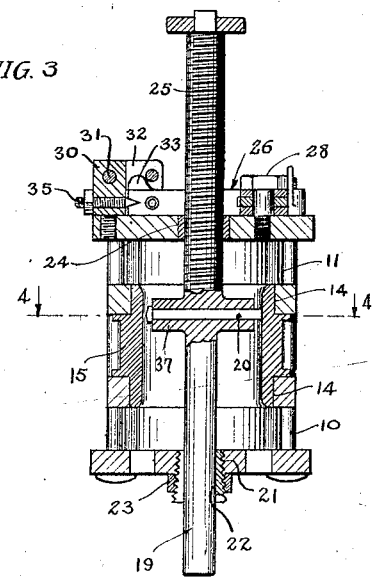
Fig. 3 is a sectional view taken on the line 3—3 of Fig. 1.
Figure 5:
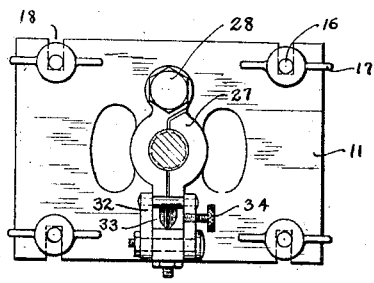
Fig. 5 is a sectional view taken on the line 5—5 of Fig. 1, the shaft carrying the reaming tool being in operative engagement with a split, shaft holding nut.
Figure 6:
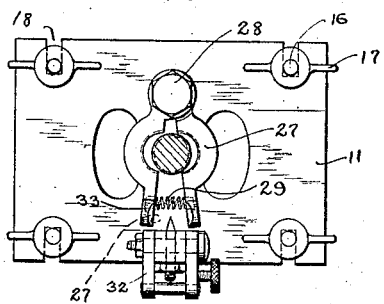
Fig. 6 is a view similar to Fig. 5 with the shaft holding nut in non-engagement with the shaft.

The means for holding the bearing during the reaming operation comprises holding members 10 and 11, the member 10 having on its lower side a pair of downwardly projecting lugs 12 which are adapted to be clamped in jaws 13 of a vise (not shown). Annular recesses 14 are provided in the adjacent ends of the holding members which are adapted to receive the ends of a two-part engine bearing 15, see Fig. 3. The holding members are effectively clamped on the bearing by a plurality of clamping bolts 16 provided with thumb nuts 17. The holding members are provided with open slots 18, see Figs. 5, 6 and 7, to permit the clamping bolts 16 to be quickly removed from the holding members without turning off the thumb nuts and then having to withdraw the bolts as would be the case if the slots 18 were not provided. By this arrangement it is only necessary to slightly loosen the thumb nuts in order to remove the bolts and then the holding members.

Figure 1:
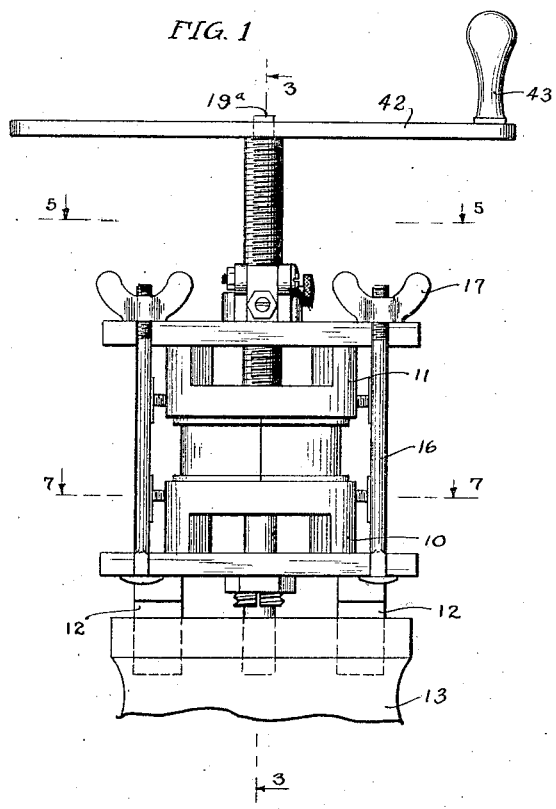
Fig. 1 is a side elevational view of apparatus embodying the principles of the invention.
Figure 2:
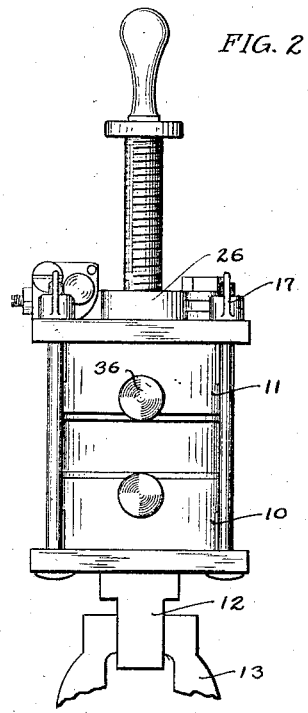
Fig. 2 is an elevational view taken from a view point at right angles to the view point of Fig. 1, and from the right-hand side thereof.

A shaft, designated as a whole by the reference numeral 19, carries a reaming tool, designated as a whole by the reference numeral 20, the latter being adapted to ream the engine bearings when the shaft is rotated. The holding member 10 is provided with a central internally threaded bearing 21. The lower end of the shaft has a plain surface and that end is maintained in axial alignment in the bearing 21 by providing an externally threaded bearing bushing 22 which is adapted to be inserted in the bearing 21. The bushing 22 is tapered externally and split on one side, see Figs. 1 and 3, to compensate for wear and to form a close fitting bearing for the lower end of the shaft, the bushing being effectively maintained in the desired position by a lock nut 23.

The holding member 11 is provided with a central aperture 24 through which the upper end of the shaft projects. The upper end of the shaft is provided with screw threads 25 and is in operative engagement with a nut, designated generally by the reference character 26. The nut 26 is formed of two parts 27, see Figs. 5 and 6. At one end the parts 27 overlap and are apertured for the insertion of a pivot screw 28 which is threaded into the holding member 11, see Fig. 3. The parts 27 are normally held in distended position by a spring 29, see Fig. 6. A bracket member 30 is threaded into the holding member 11 on the side opposite the screw 28 which member carries a pivot pin 31 on which is swingly mounted a U-shaped latch member 32, the arms of the latch member being adapted to slide over upwardly projecting lugs 33 formed on the adjacent ends of the member 27 when said members are in their closed position, see Fig. 5. The latch member may be locked in holding engagement with the lugs 33 by a set screw 34. By the arrangement just described the latch member may be released from engagement with the lugs 33 in which case the spring 29 acts to spread the two parts of the nut as clearly shown in Fig. 6. When the parts of the nut are in this position, the shaft 19 may be inserted with the reaming tool 20 ready to commence reaming the bearing. The two parts of the nut may then be brought into bearing engagement with and locked on the threaded portion of the shaft.

A screw 35 is carried by the bracket member 30 the inner end of which is conically pointed and extends into a conical recess formed in the adjacent ends of the parts 27 of the nut which arrangement serves to center the nut with relation to the reaming tool so that the parts will be accurately positioned for the reaming operation.

Figure 7:
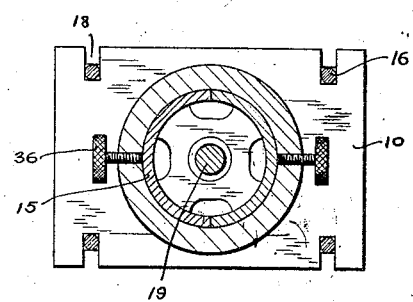
Fig. 7 is a cross sectional view taken on the line 7—7 of Fig. 1.

To prevent the bearing members from spreading apart laterally during the reaming operation a plurality of set screw 36 are provided in the holding members 10 and 11 so as to bear against the outer surfaces of the bearing parts substantially at points at right angles to the meeting edges of the bearing parts, see Fig. 7.

Figure 4:
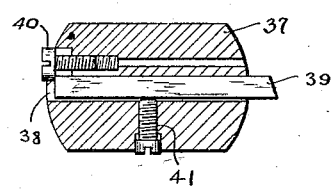
Fig. 4 is an enlarged sectional view of the cutter head and cutter taken on the line 4—4 of Fig. 3.

The reaming tool is mounted in a cutter head 37 preferably formed integrally with the shaft 19, see Fig. 4. The head 37 is provided with a transverse slot 38 in which a reaming element 39 is slidably mounted. A screw 40 determines the depth of cut to be taken by the reaming element and a set screw 41 effectively secures the reaming element to the head in the desired position.

The upper end of the shaft is provided with a squared portion 19ª which is adapted to be engaged by a crank 42 provided with a handle 43 whereby the shaft may be rotated.

Apparatus embodying the principles of the invention above described effectively and accurately reams engine bearings without the necessity of scraping them by hand as has been done heretofore. The bores of the bearings reamed by the apparatus above described will be absolutely true and concentric with respect to the outside surfaces of the bearings.

I claim:

1. A device of the class described comprising a pair of spaced holding members provided with centrally located bearing openings; means for clamping an engine bearing between said holding members; a shaft provided with a threaded portion, rotatably mounted in said bearing openings; a cutting tool carried by said shaft; a split nut pivotally carried by one of said holding members, adapted to engage and disengage the threaded portion of said shaft; and a U-shaped member pivotally carried by said holding member for positively holding said nut in its engaged position.

2. In an apparatus for reaming engine bearings, a pair of spaced holding members provided with centrally located bearing openings; means for clamping an engine bearing between said holding members; a shaft provided with a threaded portion, rotably mounted in said bearing openings; a cutting tool carried by said shaft; a split nut pivotally carried by one of said holding members, adapted to engage and disengage the threaded portion of said shaft, said nut being provided with a recess; pivoted means carried by said holding member for positively holding said nut in its engaged position; and means carried by said holding member for engaging said recess to position said nut relative to said tool.

3. In an apparatus for reaming engine bearings, a pair of spaced holding plates provided with centrally located bearing openings; means for clamping an engine bearing between said plates; a shaft provided with a threaded portion, rotatably mounted in said bearing openings; a cutting tool adjustably carried by said shaft; a split nut pivotally carried by one of said plates, the hole in said nut being adapted to register with the bearing opening in said plate;

and means carried by said plate for insuring the registration of said nut hole with said bearing opening.

4. In an apparatus for reaming engine bearings, a pair of spaced holding plates provided with centrally located bearing openings; means for clamping an engine bearing between said plates; a shaft provided with a threaded portion, rotatably mounted in said bearing openings; a cutting tool adjustably carried by said shaft; a split nut pivotally carried by one of said plates, the hole in said nut being adapted to register with the bearing opening in said plate, the coacting members of said nut being provided with registering recesses; means for locking the coacting members of said nut in co-operative engagement with the threaded portion of said shaft; and means carried by said plate adapted to engage said registering recesses for insuring the registration of said nut hole with said bearing opening.

In testimony whereof, I affix my signature.

KARL O. MUEHLBERG.